(12) United States Patent
Nguyen

(10) Patent No.: US 6,746,600 B2
(45) Date of Patent: Jun. 8, 2004

(54) FLUID FILTER WITH INTEGRATED COOLER

(75) Inventor: Ledu Q. Nguyen, Fayetteville, NC (US)

(73) Assignee: Arvin Technologies, Inc., Troy, MI (US)

(*) Notice: Subject to any disclaimer, the term of this patent is extended or adjusted under 35 U.S.C. 154(b) by 0 days.

(21) Appl. No.: 10/241,201

(22) Filed: Sep. 11, 2002

(65) Prior Publication Data

US 2003/0080036 A1 May 1, 2003

Related U.S. Application Data

(63) Continuation-in-part of application No. PCT/US01/45617, filed on Oct. 31, 2001.

(51) Int. Cl.$^7$ ............................. B01D 35/18; F01M 1/10
(52) U.S. Cl. ................... 210/168; 210/184; 210/416.1; 210/416.5; 210/444
(58) Field of Search ................... 210/168, 175, 210/184, 232, 416.1, 416.5, 435, 443, 444; 165/184

(56) References Cited

U.S. PATENT DOCUMENTS

| | | | |
|---|---|---|---|
| 1,237,722 A | 8/1917 | Stanwood | |
| 1,750,073 A | * 3/1930 | Walsh | .................. 210/351 |
| 1,900,821 A | 3/1933 | Kline | |
| 2,354,645 A | 8/1944 | Bateman | |
| 2,432,475 A | 12/1947 | Griffith | |
| 2,983,115 A | * 5/1961 | Caswell | ................. 62/285 |
| 3,468,371 A | 9/1969 | Menze | |
| 3,482,699 A | * 12/1969 | Kauffman et al. | .......... 210/184 |
| 3,487,670 A | 1/1970 | Ware | |
| 4,423,708 A | 1/1984 | Sweetland | |
| 4,487,691 A | * 12/1984 | Panora | ...................... 210/167 |
| 4,510,051 A | 4/1985 | Diry | |
| 4,522,166 A | 6/1985 | Toivio et al. | |
| 4,831,980 A | 5/1989 | Nasu et al. | |
| 4,878,536 A | 11/1989 | Stenlund | |
| 4,923,003 A | 5/1990 | Stenlund | |
| 4,923,603 A | 5/1990 | Maykulsky | |
| 4,964,459 A | 10/1990 | Stenlund | |
| 5,095,971 A | * 3/1992 | Hehl | .......................... 165/47 |
| 5,326,461 A | * 7/1994 | Legrand et al. | ............. 210/186 |
| 5,702,602 A | 12/1997 | Brown et al. | |
| 5,732,769 A | 3/1998 | Staffa | |
| 5,798,048 A | 8/1998 | Ries | |
| 5,830,348 A | 11/1998 | Vannoy et al. | |
| 5,967,111 A | 10/1999 | Hedman | |

FOREIGN PATENT DOCUMENTS

| | | |
|---|---|---|
| DE | 2 051 973 | 5/1971 |
| DE | DT 23 61 515 A1 | 6/1975 |
| DE | 3317 008 A1 | 11/1984 |
| FR | 2 558 045 | 7/1985 |
| GB | 609147 | 9/1948 |
| WO | WO 88/06228 | 8/1988 |

* cited by examiner

Primary Examiner—Fred G. Prince
(74) Attorney, Agent, or Firm—Barnes & Thornburg

(57) ABSTRACT

A fluid filter apparatus includes a filter media for filtering contaminants from unfiltered fluid (such as motor vehicle oil) and a cooling element for cooling unfiltered fluid before such fluid is passed through the filter media. The apparatus includes a filter housing formed to include a filter chamber containing the filter media.

19 Claims, 4 Drawing Sheets

FLUID FILTER WITH INTEGRATED COOLER

This application is a continuation-in-part of PCT/US01/45617, filed Oct. 31, 2001, which is expressly incorporated by reference herein.

BACKGROUND

The present disclosure relates to fluid filters, and in particular to oil filters for use in a vehicle. More particularly, the present disclosure relates to heat exchangers for use in cooling oil in an oil filter.

Fluid filters are used onboard vehicles and in other apparatus containing fluid transport systems to remove unwanted solids or other contaminants from the fluid. Oil filters and fuel filters are provided to clean oil and fuel used in vehicle engines.

SUMMARY

A fluid filter apparatus in accordance with the present disclosure includes a filter housing formed to include a filter chamber containing a filter media. The apparatus also includes a cooling element located in the filter chamber to surround the filter media. Unfiltered fluid admitted into the filter chamber is exposed to cooling temperatures associated with the cooling element before the unfiltered fluid passes through the filter media. A relatively low-temperature coolant flows through the cooling element to generate the cooling temperature. Coolant acts to reduce the temperature and engine wear to prolong the life of the engine and oil fluid.

The cooling element is used to cool the unfiltered fluid flowing in the filter chamber toward the filter media to precipitate particulate matter or other contaminants entrained in the unfiltered fluid. Any such matter (e.g., plaque, scale, or rust) that forms on the cooling element and "breaks off" will be filtered in the filter media and will not be discharged from the filter housing.

In illustrative embodiments, the filter housing includes a mounting base portion to be mounted on, for example, a vehicle engine and a removable cover portion coupled to the base portion. The cooling element is arranged in the filter chamber to define a smaller chamber containing the filter media and having an opening. Upon removal of the cover portion from the base portion, a technician can move a filter module containing the filter media into and out of the smaller chamber defined by the coolant tube to facilitate replacement of the filter module without relocation of the cooling element in the filter chamber.

In one illustrative embodiment, the cooling element includes a helix-shaped coolant tube positioned to lie in the filter chamber to surround the filter media. In another illustrative embodiment, the cooling element includes a serpentine-shaped coolant tube positioned to lie in the filter chamber to surround the filter media. In each embodiment, unfiltered fluid flowing into the filter media is cooled by exposure to cooling temperatures associated with a cooling element immersed in unfiltered fluid flowing in the filter chamber toward the filter media.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
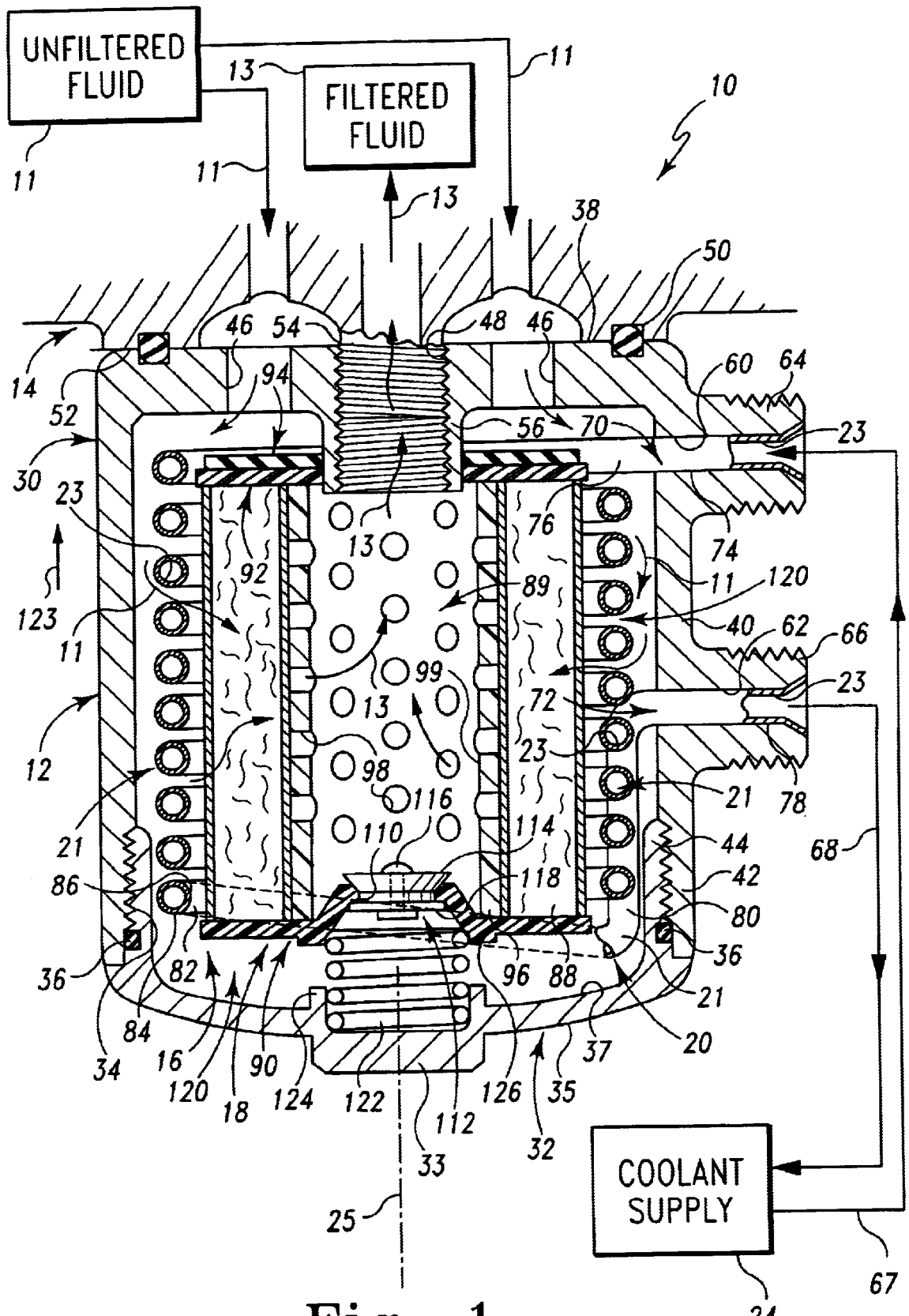
FIG. 1 is a sectional view of a first fluid filter comprising a "horizontal" helix-shaped coolant tube immersed in unfiltered fluid flowing through a filter chamber provided inside a filter housing wherein the helix-shaped coolant tube is positioned to surround a filter module to cool unfiltered fluid about to be passed through the filter media so that certain particulate matter entrained in that unfiltered fluid is precipitated upstream of the filter module and then blocked by the filter module from discharge through a filtered fluid outlet aperture formed in the filter housing.

A fluid filter apparatus 10 includes a filter housing 12 adapted to be mounted, for example, on a vehicle engine 14 and formed to include a filter chamber 16 as shown in FIG. 1. A filter module 18 is located in filter chamber 16 to filter contaminants from unfiltered fluid 11 passing through filter chamber 16. A cooler in accordance with this disclosure is immersed in unfiltered fluid 11 flowing through filter chamber 16 and is used to cool unfiltered fluid 11 on the "dirty side" of filter module 18 to enhance the contaminant filter capacity of filter module 18. Filtered fluid 13 is discharged from filter housing 12 to a destination, for example, in vehicle engine 14.

Unfiltered fluid 11 flowing through filter chamber 16 is exposed to relatively cool temperatures associated with a cooling element 20 arranged to extend into filter chamber 16 and configured to circulate a suitable coolant provided by coolant supply 24. Such exposure cools unfiltered fluid 11 about to be passed through filter module 18 to cause particulate matter entrained in unfiltered fluid 11 to be precipitated upstream of filter module 18 and blocked by filter module 18 from discharge from filter housing 12 with filtered fluid 13.

In a first embodiment illustrated in FIG. 1, cooling element 20 comprises a helix-shaped coolant tube 21 arranged to wind in a helical manner around filter module 18 and along a vertical central axis 25 of filter module 18. In a second embodiment illustrated in FIGS. 2–5, cooling element 20' comprises a serpentine-shaped coolant tube 22 looped to extend in a serpentine manner around filter module 18 and back and forth (i.e., up and down) relative to vertical central axis 25 of filter module 18'.

Filter housing 12 includes a base portion 30 and a removable cover portion 32 configured to mate with base portion 30 to close a filter module-receiving opening 34 formed in base portion 30. When mated as shown, for example, in FIG. 1, base portion 30 and removable cover portion 32 cooperate to define filter chamber 16 therebetween. Base portion 30 includes an end wall 38 adapted to face toward vehicle engine 14 and an annular side wall 40 appended to end wall 38 as shown, for example, in FIG. 1. An axially outer section 42 of annular side wall 40 is configured to mate with an axially inner section 44 of cover portion 30. In the illustrated embodiment, complementary threads formed on axially outer section 42 of annular side wall 40 and cover portion 32 are used to mate cover portion 32 to base portion 30 and an O-ring seal 36 is trapped between base portion 30 and cover portion 32 to establish a sealed connection therebetween.

A hex head member 33 is provided on an exterior surface 35 of an end wall 37 of cover portion 32 for mating with an appropriate cover removal tool (not shown). That tool can be used to rotate cover portion 32 about vertical central axis 25 to "unscrew" cover portion 32 from its mounted position on base portion 30. Removal of cover portion 32 from base portion 30 is needed to gain access to filter module 18 mounted in filter chamber 16 during filter module replacement.

End wall 38 of base portion 30 is formed to include one or more inlet apertures 46 arranged to admit unfiltered fluid 11 discharged by vehicle engine 14 into filter chamber 16. End wall 38 is also formed to include a fluid outlet aperture 48 arranged to discharge filtered fluid 13 from filter chamber 16 into vehicle engine 14. An O-ring seal 50 or other suitable seal is trapped between end wall 38 and vehicle engine 14 to establish a sealed connection therebetween. In the illustrated embodiment, vehicle engine 14 includes an exterior wall 52 adapted to mate with end wall 38 of base portion 30 and a threaded spud 54 arranged to extend into fluid outlet aperture 48 and mate with a spud receiver 56 included in end wall 38 and formed to define fluid outlet aperture 48.

Side wall 40 of base portion 30 is formed as shown in FIG. 1 to include a coolant inlet aperture 60 through which coolant from coolant supply 24 can flow via a coolant supply tube 67 into cooling element 20 and a coolant outlet aperture 62 through which coolant discharged from cooling element 20 can flow out of filter housing 12 via a coolant return tube 68 to reach coolant supply 24. In the illustrated embodiment, side wall 40 comprises an inlet post 64 formed to include coolant inlet aperture 60 and an outlet post 66 formed to include coolant outlet aperture 62. Inlet post 64 includes an exterior threaded section configured to mate with a threaded fitting (not shown) associated with coolant supply tube 67 to couple coolant supply tube 67 to inlet post 64. Also, outlet post 66 includes an exterior threaded section configured to mate with a threaded fitting (not shown) associated with coolant return tube 68 to couple coolant return tube 68 to outlet post 66. It is within the scope of this disclosure to couple tubes 67, 68 to cooling element 20 using any suitable means.

Cooling element 20 comprises a helix-shaped coolant tube 21 located in filter chamber 26, a first connector tube 70 coupled to coolant tube 21 and arranged to extend through coolant inlet aperture 60 formed in side wall 42, and a second connector tube 72 coupled to coolant tube 21 and arranged to extend through coolant outlet aperture 62 formed in side wall 42 as shown, for example, in FIG. 1. Cooling element 20 is formed to include a coolant conductor passageway 23 arranged to extend through first connector tube 70, helix-shaped coolant tube 23, and second connector tube 72 to cause liquid coolant (or other suitable coolant) admitted into passageway 23 from coolant supply tube 67 to flow along a helical path around filter media 88 established by helix-shaped coolant tube 21 and then flow into coolant return supply tube 68. Thus, coolant is circulated from coolant supply 24 through an annular region of filtered-fluid space 120 located in filter chamber 16 between filter media 88 and filter housing 12 and arranged to extend around filter media 88. In the illustrated embodiment, coolant inlet aperture 60 is formed to lie between end wall 38 and coolant outlet aperture 62. Also in the illustrated embodiment, a unitary piece of tubing is used to provide helix-shaped coolant tube 21 and first and second connector tubes 70, 72.

A radially outer portion 74 of first connector tube 70 is positioned to lie in coolant inlet aperture 60 and a radially inner portion 76 of first connector tube 70 is positioned to lie in the filter chamber 16. Radially outer portion 74 includes a straight tubular section and a flared tubular section brazed to inlet post 64 to couple first connector tube 70 to inlet post 64.

A radially outer portion 78 of second connector tube 72 is positioned to lie in coolant outlet aperture 62 and a radially inner portion 80 of second connector tube 72 is positioned to lie in filter chamber 16. A portion of radially inner portion 80 is arranged to lie in spaced-apart parallel relation to vertical central axis 25 of filter module 18 as shown in FIG. 1. Radially outer portion 78 includes a straight tubular section and a flared section brazed to outlet post 66 to couple second connector tube 72 to outlet post 66.

Helix-shaped coolant tube 21 is formed to include a module receiver chamber 82 therein containing a portion of filter module 18 therein a shown, for example, in FIG. 1. An outer portion 84 of helix-shaped coolant tube 21 is arranged to confront removable cover portion 32 to define a filter module-receiving opening 86 into module receiver chamber 82. Filter module 18 is sized and shaped to be moved through opening 86 without varying the position of helix-shaped coolant tube 21 in filter chamber 16 upon removal of cover portion 32 so as to facilitate installation and replacement of filter module 18 in module receiver chamber 82. Once filter module 18 is mounted in module receiver chamber 82, unfiltered fluid 11 is free to flow around helix-shaped coolant tube 21 to allow heat in unfiltered fluid 11 to be transferred to coolant flowing through coolant conductor passageway 23 formed in helix-shaped coolant tube 21.

Filter module 18 includes a filter media 88 formed to include a filtered-fluid region 89 to receive fluid 13 filtered in filter media 88. Filter media 88 is configured to filter contaminants from fluids such as motor oil. Filter module 18 further includes an annular first end cap 90, an annular second end cap 92, an annular gasket 94 coupled to second end cap 92, and a center tube 96 located in filtered-fluid region 89 of filter media 88. Center tube 96 is formed to include a series of apertures 98 to allow flow of filtered fluid 13 from filter media 88 into a passageway 99 formed in center tube 96. Passageway 99 is coupled in fluid communication to fluid outlet aperture 48 formed in spud receiver 56 included in end wall 38 to permit discharge of filtered fluid 13 from filter housing 12 through fluid outlet aperture 48.

First and second end caps 90, 92 are arranged to trap filter media 88 and center tube 96 therebetween as shown in FIG. 1. First end cap 90 is arranged to lie in confronting relation to removable cover portion 32 and is formed to include a bypass aperture 110 and a pressure-relief bypass valve assembly 112 mounted on first end cap 90 and arranged to open and close bypass aperture 110. Valve assembly 112 includes a valve 114, a pin 116 coupled to valve 114, and a pressure-sensitive member 118. Pressure-sensitive member 118 is illustratively a metal "spider" spring which is calibrated to deflect upon application of a critical pressure within an unfiltered-fluid space 120 in filter chamber 16 and outside of filter module 18 to bypass filter media 88 during "cold engine" start-up when unfiltered fluid 11 in unfiltered-fluid space 130 may be too viscous to travel readily through filter media 88. This bypass valve assembly 112 is also activated if filter media 88 becomes so clogged that it could deprive vehicle engine 14 of adequate fluid flow. Upon deflection of spring 118, pin 116 moves upwardly in upward direction 123 toward spud 54, thereby allowing valve 114 to move upwardly and allow unfiltered fluid 11 to pass around valve 114 through bypass aperture 110 from unfiltered-fluid space 120 into filtered-fluid region 89 for discharge from filter housing 12 through fluid outlet aperture 48.

A coiled spring 122 is mounted in unfiltered-fluid space 120 in filtered chamber 16 and arranged at one end to engage an interior socket 124 formed in removable cover portion 32 and at the other end to engage an exterior socket 126 formed in first end cap 90. Coiled spring 122 yieldably urges filter module 18 in an upward direction 123 to assume a mounted position in filter chamber 16 as shown in FIG. 1. In this position, annular gasket 94 carried on an exterior portion of second end cap 92 mates with and seals against an exterior portion of spud receiver 56 as shown, for example, in FIG. 1.

Filter media 88 is oriented in module receiver chamber 82 defined by helix-shaped coolant tube 21 to receive unfiltered fluid 11 admitted into unfiltered fluid space 120 of filter chamber 16 through one of the fluid inlet apertures 46. Such unfiltered fluid 11 passed through filter media 88 is first cooled by exposure to helix-shaped coolant tube 21 surrounding filter media 88 (and immersed in unfiltered fluid 11) to cause particulate matter entrained in the unfiltered fluid 11 to be precipitated and blocked by filer media 88 from movement into filtered-fluid region 89 of filter media 88. Filter media 88 is also oriented to position filtered-fluid region 89 in fluid communication with fluid outlet aperture 48 to cause filtered fluid 11 to flow from filtered-fluid region 89 through fluid outlet aperture 48 to a destination outside filter housing 12.

Figure 4:
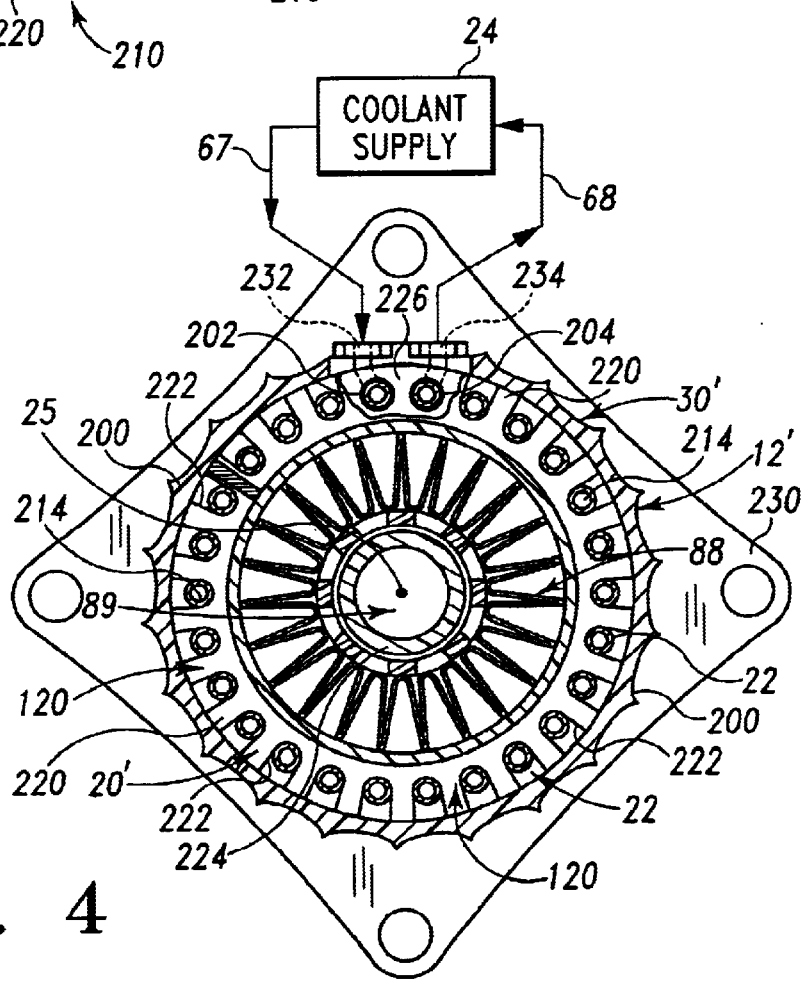
FIG. 4 is a sectional view taken along line 4—4 of FIG. 2 showing placement of the vertical tube sections and a portion of the helix-shaped heat-exchanger fin mating with the vertical tube sections in an annular space defined by an annular inner wall of the filter housing and an annular outer wall of the filter media and showing a coolant supply coupled to an inlet and outlet of the cooling element including the serpentine-shaped coolant tube.
Figure 5:
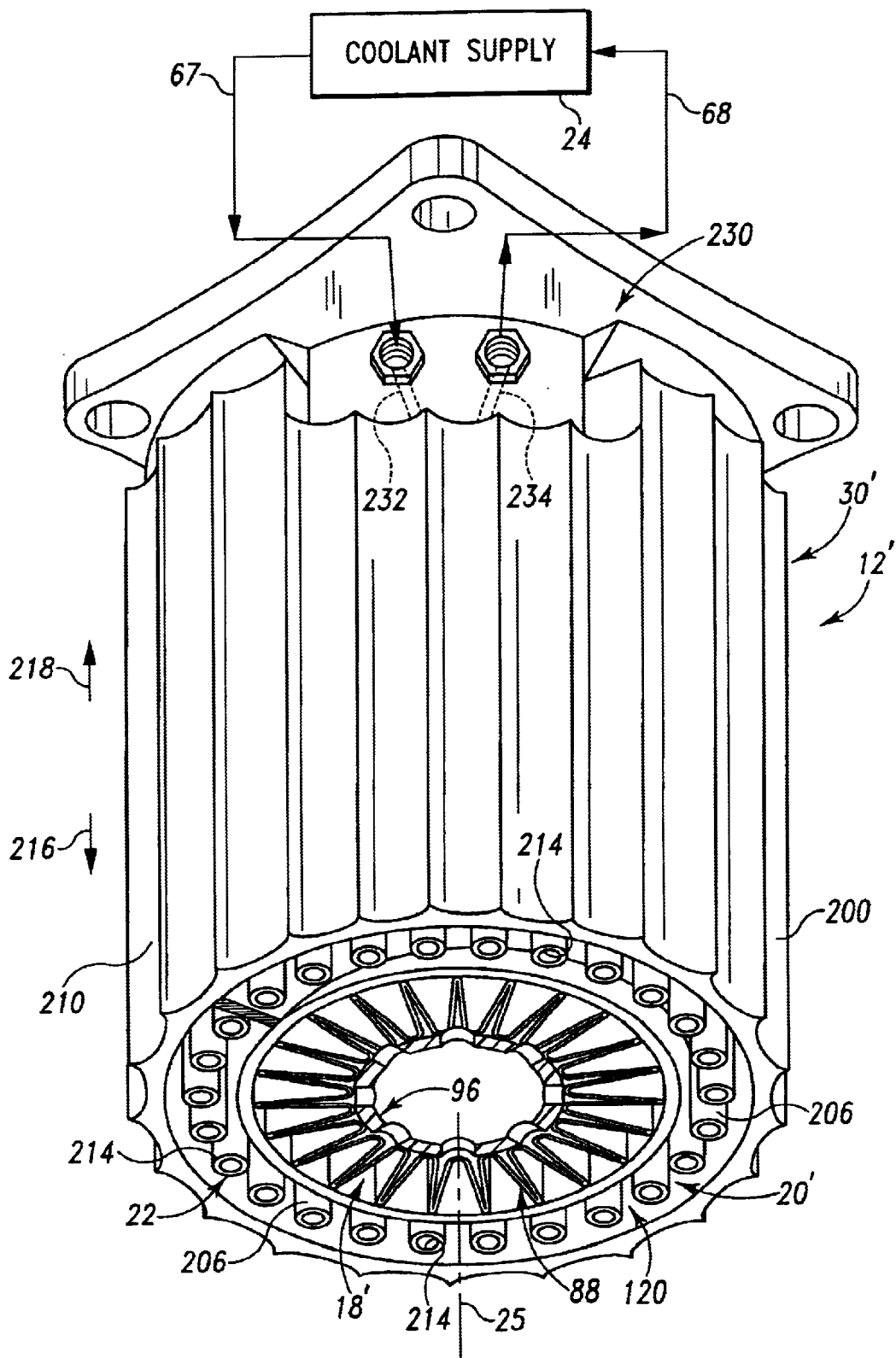
FIG. 5 is a perspective view of the portion of the fluid filter shown in FIG. 4 showing the outer fins that help transfer the heat and cool down using air.

In the embodiment illustrated in FIGS. 2–5, a cooling element 20' comprising a serpentine-shaped coolant tube 22 is employed to cool unfiltered fluid 11 about to pass through filter media 88. Filter housing 12' includes a base portion 30' and a removable cover portion 32' that cooperates with base portion 30' to define a filter chamber 16 containing a filter module 18' and serpentine-shaped coolant tube 22. In this embodiment, filter housing 12' is formed to include a plurality of radially outwardly extending projections or fins 200. The fins 200 illustratively extend longitudinally as shown in FIG. 5. Optionally, fins 200 may be oriented latitudinally around the curvature of filter housing 12'. Inclusion of fins 200 on filter housing 12' substantially increases the surface area of base portion 30' and cover portion 32' which is in contact with ambient air, thereby increasing the efficiency of the cooling operation as heat is transferred efficiently from the unfiltered fluid 11 in filter chamber 16 to serpentine-shaped coolant tube 22 and through fins 200 of filter housing 12'.

Figure 2:
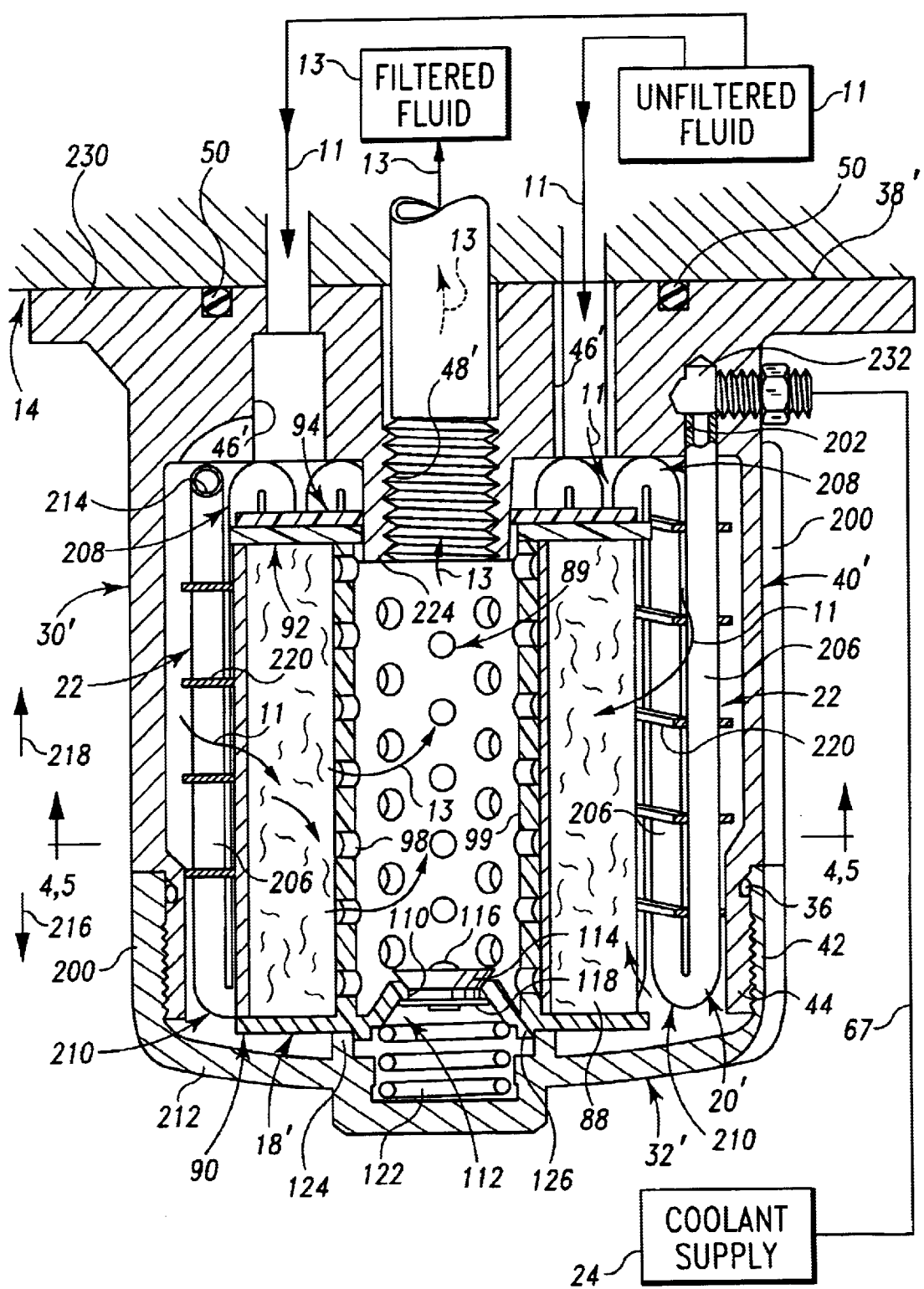
FIG. 2 is a sectional view of a second fluid filter comprising a "vertical" serpentine-shaped coolant tube immersed in unfiltered fluid flowing through a filter chamber provided inside a filter housing wherein the serpentine-shaped coolant tube is positioned to surround a filter module to cool unfiltered fluid about to be passed through the filter module so that certain particulate matter entrained in that unfiltered fluid is precipitated upstream of the filter module and then blocked by the filter module from discharge through a filtered-fluid outlet aperture formed in the filter housing.
Figure 3:
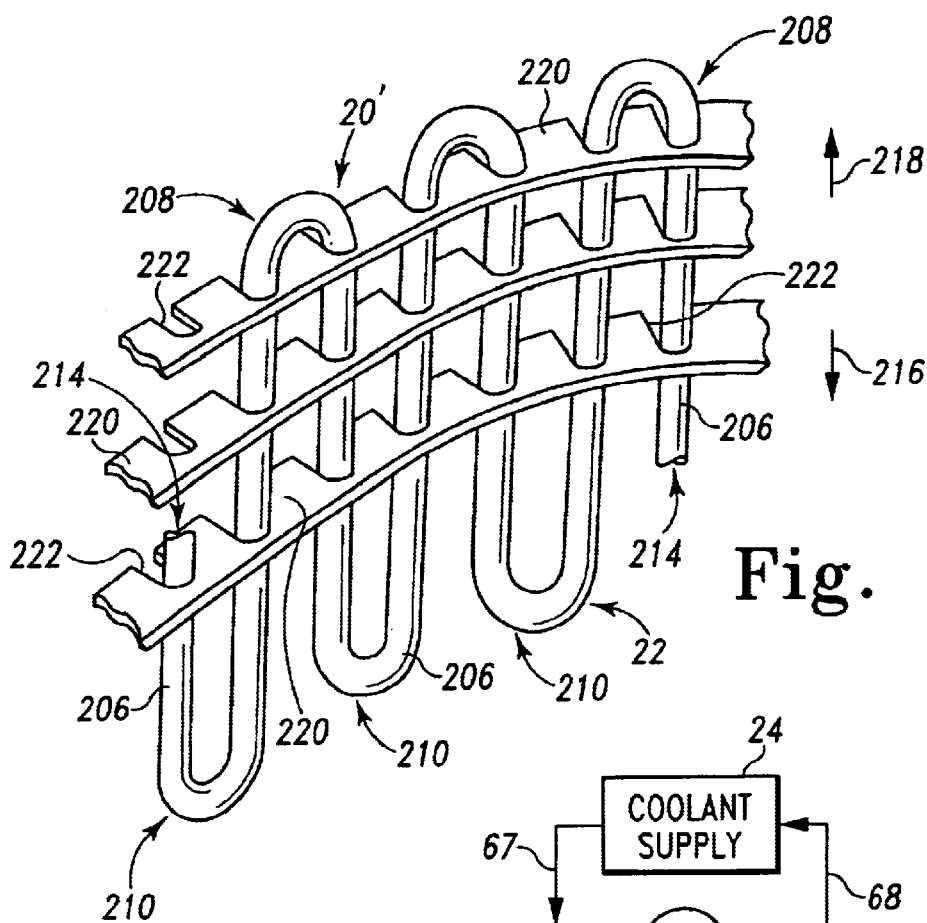
FIG. 3 is a reduced partial perspective view of a portion of the serpentine-shaped coolant tube of FIG. 2 showing a series of vertical tube sections and U-shaped tube sections and showing a helix-shaped heat-exchanger fin brazed to the vertical tube portions.

As shown in FIG. 2, base portion 30' includes an end wall 38' formed to include one or more inlet apertures 46' arranged to admit unfiltered fluid 11 into filter chamber 16, an outlet aperture 48' arranged to discharge filtered fluid 13 from filter chamber, and a coolant inlet aperture 202 and a coolant outlet aperture 204 (shown best in FIG. 4) sized and arranged to allow cooling element 20' to pass through end wall 38'. Base portion 30' also includes a side wall 40' formed to include portions of fins 200.

As shown in FIG. 2, filter module 18' comprises filter media 88, center tube 96, first and second end caps 90, 92, and a gasket 94. A bypass valve assembly 112 is mounted in a bypass aperture 110 formed in first end cap 90. A coiled spring 122 is used to maintain filter module 18' in a mounted position in filter chamber 16 to define an unfiltered-fluid space 120 between filter housing 12' and filter module 18'.

As shown in FIGS. 2, 4, and 5, filter media 88 is mounted in filter chamber 16 to define an annular region of unfiltered-fluid space 120 between filter media 88 and filter housing 12'. Serpentine-shaped coolant tube 22 of cooling element 20' is arranged to extend in a serpentine manner in that annular region around filter media 88 and is immersed in unfiltered fluid 11 flowing through that annular region.

Serpentine-shaped coolant tube 22 comprises a series of vertical tube sections 206 arranged to lie in spaced-apart relation to a vertical central axis 25 of filter media 88 and to one another as suggested in FIGS. 2, 4, and 5. Serpentine-shaped coolant tube 22 further comprises a first series of U-shaped tube sections 208 arranged to interconnect inner "ends" of adjacent pairs of vertical tube sections 206 in close proximity to end wall 38' of base portion 30'. Serpentine-shaped coolant tube 22 also comprises a second series of U-shaped tube sections 210 arranged to interconnect outer "ends" of adjacent pairs of vertical tube sections 206 in close proximity to an end wall 212 of removal cover portion 32'. Serpentine-shaped coolant tube 22 is thus provided with a serpentine coolant conductor passageway 214 to cause liquid coolant (or other suitable coolant) admitted into serpentine-shaped coolant tube 22 to flow alternately in an outer direction 216 toward end wall 212 of removable cover portion 32' and an inner direction 218 toward end wall 38' of base portion 30' as such liquid coolant flows through serpentine-shaped coolant tube 22 in the annular region of filtered-fluid space 120 around filter media 88. The undulating or serpentine shape of coolant tube 22 maximizes the available surface area of contact between unfiltered fluid 11 and coolant tube 22.

As shown, for example, in FIGS. 2–5, cooling element 201 further comprises a helix-shaped heat-exchanger fin 220 coupled to vertical tube sections 206 to extend in a helical manner around filter media 88 and along vertical central axis 25 of filter media 88. Heat-exchanger fin 220 is formed to include open-ended slots 222 sized to receive vertical tube sections 206 therein as shown best in FIGS. 3 and 4. Heat-exchanger fin 220 is brazed (or coupled using any suitable process) to the exterior surface of vertical tube sections 206. Heat-exchanger fin 220 is made of aluminum or another suitable non-corrosive, thermally conductive metal such as copper. The addition of heat-exchanger fin 220 provides cooling element 20' with additional cooling surface area to increase the heat transfer efficiency of cooling element 20' to unfiltered fluid 11. A heat exchanger fin may also optionally be used in cooling element 20 of the embodiment of FIG. 1.

As suggested in FIGS. 2 and 4, end wall 38' of filter housing 12' includes a center portion 224 formed to include fluid outlet aperture 48', a radially outer annular portion 226 formed to include coolant inlet and outlet apertures 202, 204, and a middle annular portion 228 located between center portion 224 and radially outer portion 226 and formed to include fluid inlet apertures 46'. A foundation 230 or other suitable structure can be used to support filter housing 12' on vehicle engine 14. In the illustrated embodiment, foundation 230 is formed to include one coolant conductor passageway 232 to couple coolant supply tube 67 to coolant inlet aperture 202 and another coolant conductor passageway 234 to couple coolant return tube 68 to coolant outlet aperture 204. Gasket 50 establishes a seal between foundation 230 and filter housing 12'.

What is claimed is:

1. A fluid filter apparatus comprising a filter housing formed to include a filter chamber, an inlet aperture adapted to admit fluid into the filter chamber, and an outlet aperture adapted to discharge fluid from the filter chamber, a filter module positioned to lie in the filter chamber and formed to include a filtered-fluid region located to receive fluid that has passed through the filter module and to communicate with the outlet aperture to permit fluid flow from the filtered-fluid region through the outlet aperture to a destination outside the filter housing, and coolant means for conducting a liquid coolant through an unfiltered-fluid space located in the filter chamber between the filter housing and the filter module to cool unfiltered fluid flowing in a downstream direction in the unfiltered-fluid space from the inlet aperture to the filter module so that particulate matter entrained in the unfiltered fluid is precipitated in the unfiltered-fluid space and blocked by the filter module from movement into the filtered-fluid region formed in the filter module, wherein the coolant means includes a cooling element formed to include a coolant conductor passageway and arranged to lie in the unfiltered-fluid space and extend around the filter module, the filter module includes a filter media having a vertical central axis and the cooling element is wound to extend in a helical manner around the filter media and along the vertical central axis of the filter media, the filter housing includes an end wall adapted to face toward a vehicle engine and formed to include the inlet and outlet apertures and a side wall appended to the end wall, and the cooling element further includes a coolant inlet arranged to extend through an inlet aperture formed in the side wall to admit liquid coolant into the coolant conductor passageway formed in the cooling element and a coolant outlet arranged to extend through an outlet aperture formed in the side wall to discharge liquid coolant from the coolant conductor passageway.

2. A fluid filter apparatus comprising a filter housing formed to include a filter chamber, a fluid inlet aperture adapted to admit fluid into the filter chamber, a fluid outlet aperture adapted to discharge fluid from the filter chamber, a coolant inlet aperture, and a coolant outlet aperture, a coolant tube located in the filter chamber and formed to include a module receiver chamber therein, one end of the coolant tube being coupled in fluid communication to the coolant inlet aperture to receive liquid coolant from a coolant supply outside of the filter housing, another end of the coolant tube being coupled in fluid communication to the coolant outlet aperture to discharge liquid coolant from the filter housing, and a filter module positioned to lie in the filter chamber and the module receiver chamber, the filter module including a filter media formed to include a filtered-fluid region to receive fluid filtered in the filter media, the filter media being oriented in the module receiver chamber to receive unfiltered fluid admitted into the filter chamber through the fluid inlet aperture and cooled by exposure to the coolant tube surrounding the filter media to cause particulate matter entrained in the unfiltered fluid to be precipitated and blocked by the filter media from movement into the filtered-fluid region of the filter media, the filter media also being oriented in the module receiver chamber to position the filtered-fluid region in fluid communication with the fluid outlet aperture to cause fluid flow from the filtered-fluid region through the fluid outlet aperture to a destination outside the filter housing, wherein the filter housing includes a base portion adapted to mount on a vehicle engine and a removable cover portion mounted for movement on an outer end of the base portion to close an opening formed in the outer end of the base portion, the base portion and the removable cover portion cooperate to define the filter chamber therebetween, and an outer portion of the coolant tube arranged to confront the removable cover portion is formed to define a filter module-receiving opening into the module receiver chamber to permit movement of the filter module therethrough without varying the position of the coolant tube in the filter chamber upon removal of the removable cover portion to facilitate installation and replacement of the filter module in the module receiver chamber.

3. The apparatus of claim 2, wherein the coolant tube is arranged to extend in a non-helical, serpentine manner around the filter media.

4. The apparatus of claim 3, wherein the filter media has a vertical central axis and the coolant tube includes a series of vertical tube sections arranged to lie in spaced-apart parallel relation to the vertical central axis of the filter media and to one another.

5. The apparatus of claim 4, further comprising a helix-shaped heat exchanger fin coupled to the vertical tube sections to extend in a helical manner around the filter media and along the vertical central axis of the filter media.

6. The apparatus of claim 4, wherein the coolant tube further includes a first series of U-shaped tube sections arranged to interconnect inner ends of adjacent pairs of vertical tube sections in close proximity to an end wall of the base portion and a second series of U-shaped tube sections arranged to interconnect outer ends of adjacent pairs of vertical tube sections in close proximity to an end wall of the removable cover portion to provide the coolant tube with a non-helical, serpentine coolant conductor passageway to cause liquid coolant admitted into the coolant conductor passageway to flow alternately in an outer direction toward the end wall of the removable cover portion and an inner direction toward the end wall of the base portion as such liquid coolant flows through the coolant tube in an annular region around the filter media.

7. The apparatus of claim 2, wherein the base portion is formed to include the fluid inlet and outlet apertures.

8. The apparatus of claim 7, wherein the base portion includes an end wall adapted to face toward a vehicle engine and formed to include the fluid inlet and outlet apertures and a side wall appended to the end wall and configured to mate with the removable cover portion and the side wall is formed to include the coolant inlet and outlet apertures.

9. The apparatus of claim 7, wherein the base portion includes a side wall configured to mate with the removable cover portion and an end wall adapted to face toward a vehicle engine and formed to include the fluid inlet and outlet apertures and the coolant inlet and outlet apertures.

10. The apparatus of claim 9, wherein the end wall includes a center portion formed to include the fluid outlet aperture, a radially outer annular portion formed to include the coolant inlet and outlet apertures, and a middle annular portion located between the center portion and the radially outer annular portion and formed to include the fluid inlet aperture.

11. The apparatus of claim 2, wherein the filter media includes a vertical central axis and the coolant tube is wound to extend in a helical manner around the filter media and along the vertical central axis of the filter media.

12. An oil filter assembly for use with an engine having a cooling system, the oil filter assembly comprising:

a housing defining a first chamber for receiving oil from the engine, the housing including (a) a housing base having a first end configured to be mounted to the engine and a second end having a first threaded surface, and (b) a housing cover having a second threaded surface for threadably mating with the first threaded surface of the housing base;

a cooling element defining a second chamber for receiving coolant from the an oil inlet for receiving unfiltered oil from the engine and passing the oil into the first chamber;

an oil outlet for passing filtered oil back to the engine;

a replaceable filter element located within the first chamber for filtering the oil;

a coolant inlet for receiving low temperature coolant from the cooling system and passing said coolant to the second chamber defined by the cooling element; and a coolant outlet for passing warmed coolant from the second chamber defined by the cooling element to the cooling system.

13. The oil filter assembly of claim 12, wherein the housing includes a quick release channel and a quick release valve, the quick release valve releasably sealing the quick release channel by moving from a sealed position when the housing base and housing cover are threadably mounted to an open position allowing oil flow through the channel upon unscrewing of the housing cover from the housing base.

14. The oil filter assembly of claim 12, wherein the housing has an exterior surface with a plurality of projections extending outwardly therefrom to facilitate heat transfer from the housing.

15. The oil filter assembly of claim 14, wherein adjacent projections of the plurality of projections are separated by a housing wall portion having a substantially thinner cross section than the adjacent projections to enhance the transfer of heat from the oil to the exterior of the housing.

16. The oil filter assembly of claim 12, wherein the cooling element is dimensioned to define an internal cavity, and wherein the filter element is dimensioned to be mounted substantially within the cavity.

17. The oil filter assembly of claim 12, wherein the tubing is arranged to form a helical member defining a central cavity.

18. The oil filter assembly of claim 12, wherein the tubing is formed into an annular member having a plurality of longitudinally extending sinusoidal portions.

19. The oil filter assembly of claim 18, wherein the annular member is dimensioned to define an internal cavity and wherein the filter element is dimensioned to be mounted substantially within the internal cavity.

* * * * *